United States Patent
Park

(12) 
(10) Patent No.: US 7,024,179 B2
(45) Date of Patent: Apr. 4, 2006

(54) METHOD OF REPORTING CHANGE OF MOBILE COMMUNICATION SERVICE OPTION TO MOBILE SWITCHING CENTER

(75) Inventor: Su Hyun Park, Anyang-si (KR)

(73) Assignee: LG Electronics Inc., Seoul (KR)

(*) Notice: Subject to any disclaimer, the term of this patent is extended or adjusted under 35 U.S.C. 154(b) by 358 days.

(21) Appl. No.: 09/955,166

(22) Filed: Sep. 19, 2001

(65) Prior Publication Data

US 2002/0037710 A1    Mar. 28, 2002

(30) Foreign Application Priority Data

Sep. 23, 2000 (KR) .............................. 2000-55972

(51) Int. Cl.
*H04B 5/00* (2006.01)
*H04M 11/10* (2006.01)

(52) U.S. Cl. .............. 455/414; 455/412; 455/413; 455/436; 455/439; 455/466; 455/517; 455/560

(58) Field of Classification Search .............. 455/455, 455/412, 413, 414, 415, 417, 450, 466, 517, 455/560, 436, 439, 440, 419; 370/335, 342, 370/347

See application file for complete search history.

(56) References Cited

U.S. PATENT DOCUMENTS

| 5,708,656 | A  | * | 1/1998  | Noneman et al. | 370/335 |
| 5,878,036 | A  | * | 3/1999  | Spartz et al.  | 370/335 |
| 6,081,534 | A  | * | 6/2000  | Sipila         | 370/466 |
| 6,134,434 | A  | * | 10/2000 | Krishnamurthi et al. | 455/419 |
| 6,195,546 | B1 | * | 2/2001  | Leung et al.   | 455/419 |
| 6,230,024 | B1 | * | 5/2001  | Wang et al.    | 455/557 |
| 6,321,090 | B1 | * | 11/2001 | Soliman        | 455/440 |
| 6,654,602 | B1 | * | 11/2003 | Fye et al.     | 455/418 |

* cited by examiner

*Primary Examiner*—Allan Hoosain
(74) *Attorney, Agent, or Firm*—Fleshner & Kim, LLP

(57) ABSTRACT

A method of reporting a result of service option re-negotiation to a mobile switching center of a CDMA communication services is disclosed. An assignment completion message structure or a service option report message structure is used to report the changed service option. The method using the assignment completion message structure includes transmitting a message type, a channel number representing a communication path being used, encoded information, and contents of the changed service option. Also, the method using the service option report message structure includes transmitting a message type and the contents of the changed service option.

23 Claims, 6 Drawing Sheets

| Infomation Element | Element Direction | Remarks |
|---|---|---|
| Message Type | BS ⇒ MSC | INFORMATION ELEMENTS IN THE EXISTING MESSAGE |
| Channel Number | BS ⇒ MSC | |
| Encryption Information | BS ⇒ MSC | |
| Service Option | BS ⇒ MSC | |
| Service Option List | BS ⇒ MSC | INFORMATION ELEMENT ADDED ACCORDING TO PRESENT INVENTION |

| Information Element | Element Direction | Remarks |
|---|---|---|
| Message Type | BS ⇒ MSC | NEWLY DEFINED MESSAGE |
| Service Option List | BS ⇒ MSC | |

METHOD OF REPORTING CHANGE OF MOBILE COMMUNICATION SERVICE OPTION TO MOBILE SWITCHING CENTER

BACKGROUND OF THE INVENTION

1. Field of the Invention

The present invention relates to a mobile communication service, and more particularly to a method of reporting a service option re-negotiation to a mobile switching center.

2. Background of the Related Art

Generally, when an call (i. e., originating/terminating call) is established in a related art CDMA mobile communication system, the service option negotiated between a mobile station (MS) and a base station is reported to a mobile switching center.

Specifically, if a mobile station wants to receive a specific service, it requests the base station a service option corresponding to that service in an initial call setup procedure. Then the base station and the mobile switching center assign the required resources to provide the specified service to the mobile station according to the service option negotiated with the mobile station.

In the call (i. e., originating/terminating call) setup procedure between the mobile station and the base station, the mobile station and the base station perform a service option negotiation procedure. Then the base station reports negotiated service option to the mobile switching center. The mobile switching center makes accounting information or creates a call detailed record(CDR) based on the service option information.

If the service option needs to be changed by the base station, for example due to base station's resource management, or by the mobile station during the conversation, a service option re-negotiation procedure can be performed. The service option re-negotiation is carried out in accordance with the communication standard for the signal process between the mobile station and the base station TIA/EIA IS-2000.5.

FIG. 1 illustrates a mobile communication system. Referring to FIG. 1, the mobile communication system comprises a mobile station (MS) 1, a base transceiver station (BTS) 21 and a base station controller (BSC) 22, namely base station, and a mobile switching center (MSC) 3. Communication between the mobile station 1 and the base station (21,22) is performed according to the IS-2000 standard. Communication between the base station 21,22 and the mobile switching center 3 is performed according to the 3G-IOS standard.

FIG. 2 illustrates the call set-up procedure of a CDMA mobile communication system. The procedure in the FIG. 2 focuses on the originating call setup procedure including service option negotiation process. Here, the service option negotiation procedure in FIG. 2 is also applied to the terminating call set-up procedure.

FIG. 3 illustrates the structure of a 3G-IOS Assignment Complete message including the service option determined through the call set-up procedure of FIG. 2. This message is transmitted from the base station to the mobile switching center. The message structure comprises a one (1) byte message type field, 301 for message discrimination, a channel number field 302, representing the channel number allocated, encryption information 303, representing encoding information of transmitted data, and a service option 304 representing service. The service option includes a service option information element identifier (IEI) 304', and service option information 304", representing value of the service option.

A related art originating call setup procedure will be described with reference to FIG. 2. First, when a user attempts to initiate a call, the mobile station transmits a TIA/EIA IS-2000 Origination message, including a service option so_A identifying the service required by the user. The origination message is transmitted to the base station on an access channel (step 201).

The base station, having received the IS-2000 Origination message, transmits an IS-2000 Acknowledgement Order to the mobile station (step 202). The base station then assigns a service option connection identifier (SOCI) (expressed by 1 byte to discriminate respective services) to the corresponding service. The SOCI is an identifier element for identifying the service provided between the base station and the mobile switching center. The base station transmits a 3G-IOS connection management (CM) service request message, including the service option so_A requested by the mobile station and corresponding SOCI to that service so_A, to the mobile switching center using a 3G-IOS complete layer 3 information message (step 203). The sending of this message drives a timer T303 for awaiting a 3G-IOS assignment request message from the mobile switching center (step 203).

Then the mobile switching center transmits a 3G-IOS Assignment Request message to the base station to request the assignment procedure for the radio resources (step 204). The sending of this message drives a timer T10 for a awaiting a 3G-IOS Assignment Completion message. The Assignment Request message terminates the timer T303. The base station and the mobile station then exchange a channel assignment message for the radio resource assignment process (i. e., traffic channel assignment process), a traffic preamble signal for matching the traffic channel synchronization, the base station sends Acknowledgment Order to acknowledge the traffic channel preamble, and the mobile station sends Acknowledgment Order (step 205).

After completion of the radio resources assignment procedure, the base station newly assigns a connection reference (CON_REF) defined in the TIA/EIAIS-2000.5 specification as an identifier for identifying the service between the mobile station and the base station. The base station then sends a Service Connection message to the mobile station, and the mobile station sends a Service Connection Completion message to the base station. These messages are used for determining a service configuration including the CON_REF Let's call it as CON_REF #1) and the corresponding service option so_A (step 206). And the service option could include "13k voice", "8k enhanced voice rate control (EVRC)" in case of voice call to identify the kind of service and the quality of service.

According to the assignment request at step 204, the base station transmits to the mobile switching center the 3G-IOS Assignment Completion message, including the service option so_A determined through steps 205 and 206 (step 207). The mobile switching center, upon receiving this message, terminates the timer T10.

After the above described processes, the mobile station, base station, and mobile switching center enter into in a conversation state, and the mobile switching center uses the service option included in the 3G_IOS Assignment Completion message received from the base station for creation of the billing information or the CDR.

Subsequently, if the base station requires a change of the service option due to, for example, resource management of the system or a request of the mobile station during the conversation, a service option re-negotiation procedure can be performed according to the communication standard TIA/EIA IS-2000.5 between the mobile station and the base station (step 208).

When setting up the call, as described above, the service option negotiated between the mobile station 1 and the base station 21 and 22 is reported to the mobile switching center 3 using the 3GIOS Assignment Completion message as shown in FIG. 3. There ported information is used for reasons such as billing information.

When the service option of the call is changed through the service option re-negotiation procedure during the conversation, however, there is no way to report the change to the mobile switching center 3 currently. Instead, the mobile switching center can create the billing information or the CDR using only the service option negotiated during the call setup. Thus, the initially created information becomes inaccurate if service option re-negotiation procedure occurs during the conversation.

For example, if service option is changed from a 13k voice to a new value of 8k EVRC through service re-negotiation, there is no way for the base station to report the change of service option to the mobile switching center. Consequently, the data created based on only the service option negotiated during the call setup is incorrect.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method of reporting a service option changed according to a re-negotiation between a mobile station and base station during conversation to a mobile switching center.

Another object of the present invention is to provide a method of using a changed service option.

Another object of the present invention is to provide a method of reporting the result of the service option re-negotiation procedure performed when at least two services are simultaneously provided with respect to one mobile station to a mobile switching center.

In order to achieve the above objects, in whole or in parts, a new method provided is that the base station reports a changed service option using an Assignment Completion message to a mobile switching center, comprising a message type, a channel number representing a communication path being used, transmitting encoded information, and the changed service option.

In order to achieve the above objects, in whole or in parts, the other new method provided that the base station reports a changed service option using a Service Option Report message, comprising a message type and the changed service option.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A method of reporting a mobile switching center 3 the service option changed by a service re-negotiation procedure between the mobile station 1 and the base station 21, 22 after the completion of call set-up is described below. Additionally, the message structure and a procedure between the base station 21, 22 and the mobile switching center used for reporting service option changed as a result of re-negotiation will also be described.

Figure 4:
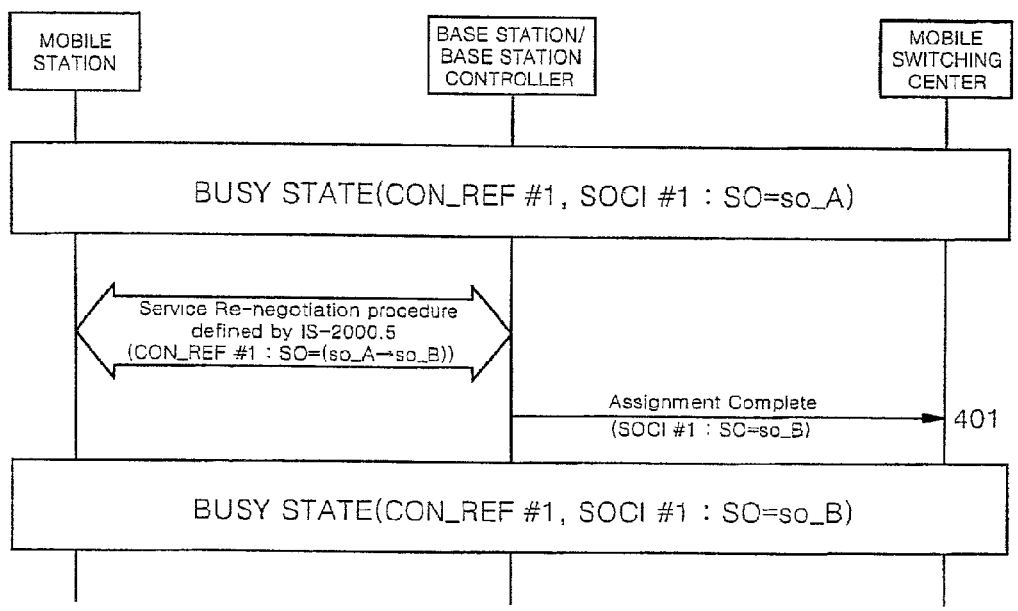
FIG. 4 is a flowchart illustrating a method of reporting a changed service option through a service option re-negotiation between a mobile station and base station using 3G-IOS Assignment Complete message.

FIG. 4 illustrates one method of reporting the changed service optionthrough the service option re-negotiation between the mobile station and the base station. This method uses Assignment Complete message to report the changed service option to the MSC.

Figure 1:
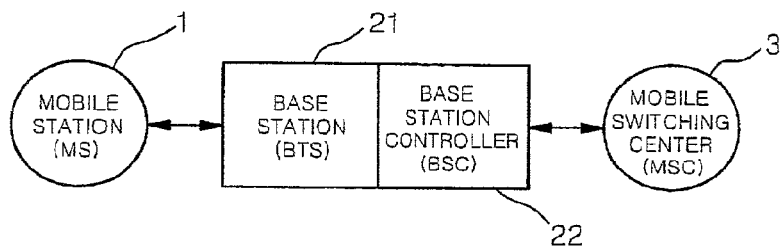
FIG. 1 is a drawing illustrating a mobile communication system.
Figure 2:
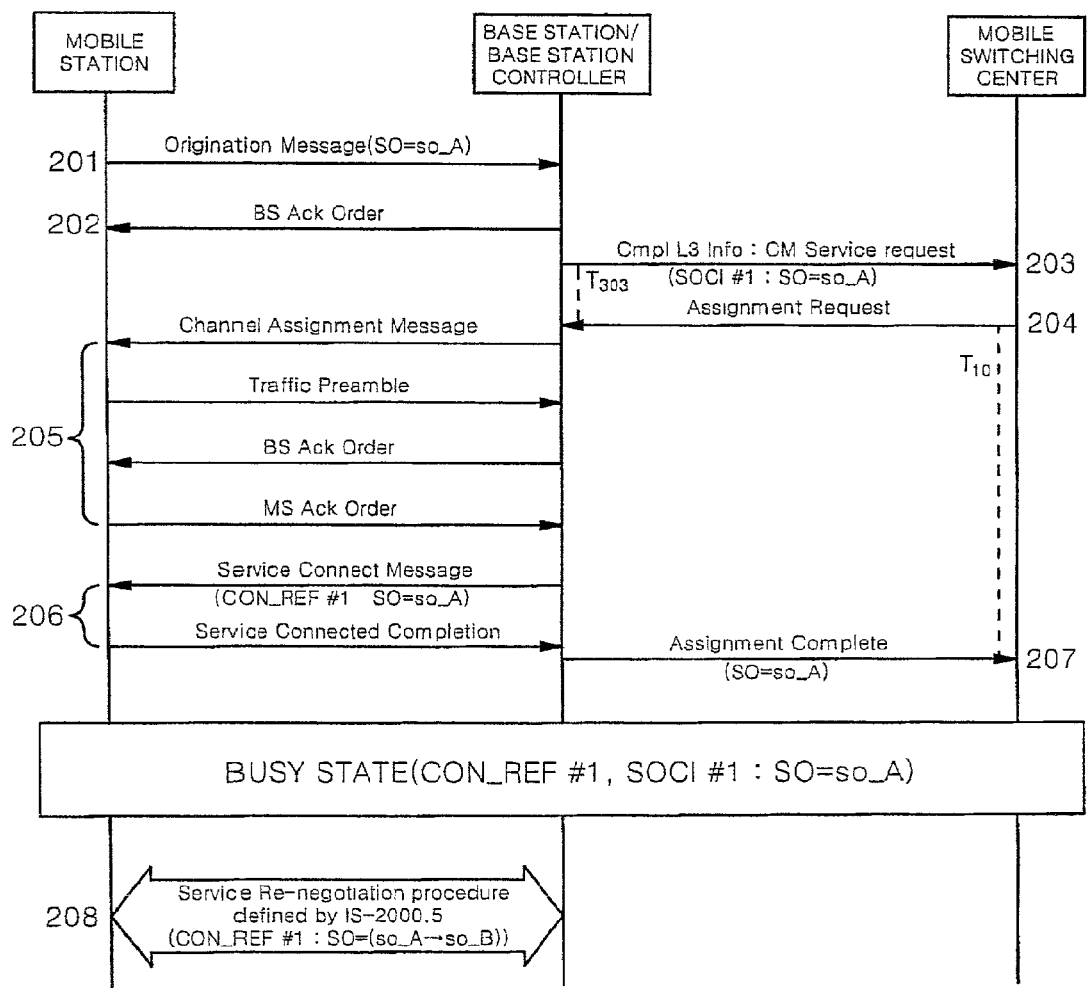
FIG. 2 is a flowchart illustrating a call setup procedure of a related art CDMA mobile communication system.
Figure 3:
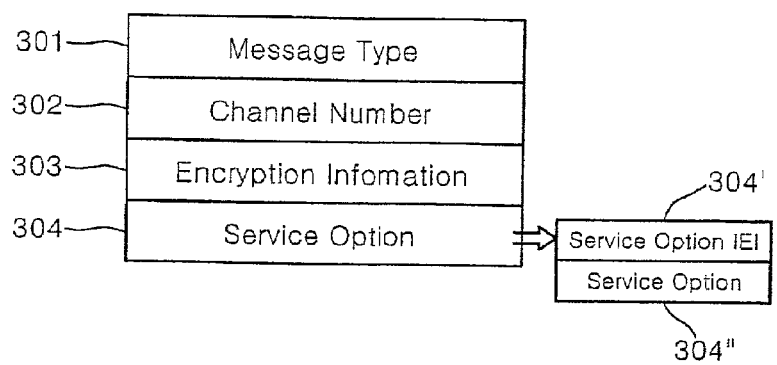
FIG. 3 is a drawing illustrating a structure of a related art 3G-IOS Assignment Complete message.
Figures 5, 6:
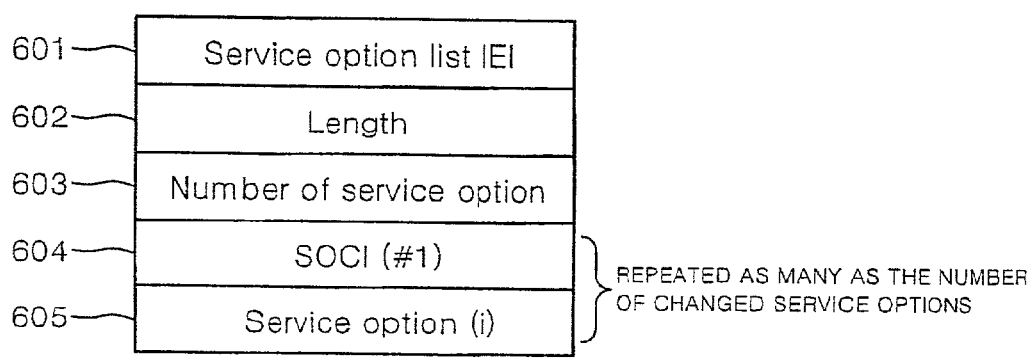
FIG. 5 is a drawing illustrating the structure of a 3G-IOS Assignment Complete message of FIG. 4.
FIG. 6 is a drawing illustrating a structure of a service option list in the message structure of FIG. 5.

FIG. 5 illustrates the structure of the Assignment Complete message in the FIG. 4. As shown in FIG. 5, changed service option information is added to a conventional Assignment Complete message, which is defined in the 3G-IOS A1 I/F. This redefined Assignment Complete message is used to report to the mobile switching center. The redefined message modify a conventional 3G-IOS A1 message structure (as shown in FIG. 3) which is used to report the completion of the call set up to the mobile switching center by adding a new field, service option list. The service option list is an information element that can contain the result of service re-negotiation between the mobile station and the base station.

FIG. 6 illustrates the structure of the service option list in the message structure of FIG. 5. To support one or more services (for example, a voice call and a data call) simultaneously, the service option list structure preferably comprises a one (1) byte service option list IEI 601 to identify respective provided services, a length field 602 to indicate a length of transmitted information, and a number of service options field 603 to indicate the number of service options changed as a result of negotiation. Also, a SOCI field (#1,#2) 604 is included to identify the changed service, and a service option (i) field 605 is provided to indicate the corresponding service information (i. e., option) (for example, so_A and so_B are identified by two bytes). The SOCI(#1,#2) 604 and the service option (i) 605 information are repeated as many as the number of service options 603.

Figures 7, 8:
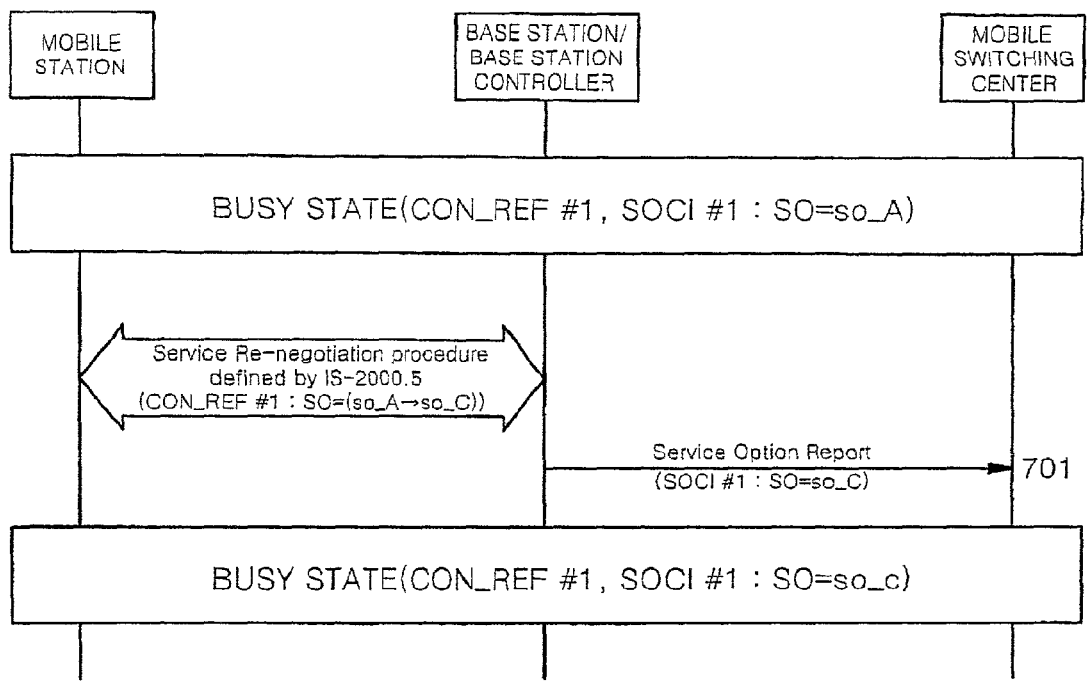
FIG. 7 is a flowchart illustrating a method of reporting a changed service option through a service option re-negotiation using Service Option Report message.
FIG. 8 is a drawing illustrating the structure of a Service Option Report message of FIG. 7.

FIG. 7 illustrates the other method of reporting a new service option that has changed through the service option re-negotiation between the mobile station and the base station. This method is accomplished by using a Service Option Report message that is a new message not defined in the conventional 3G-IOS A1I/F.

FIG. 8 illustrates a preferred structure of the service option report message in the FIG. 7. The service option report message preferably comprises a one (1) byte message type to identify respective messages, and a service option list. The service option list information is the same as that of FIG. 5.

FIGS. 9, 10, 11, and 12 illustrate useable methods of reporting to the mobile switching center the result of service option renegotiation between the mobile station and the base station in various cases according to the present invention.

Figure 9:
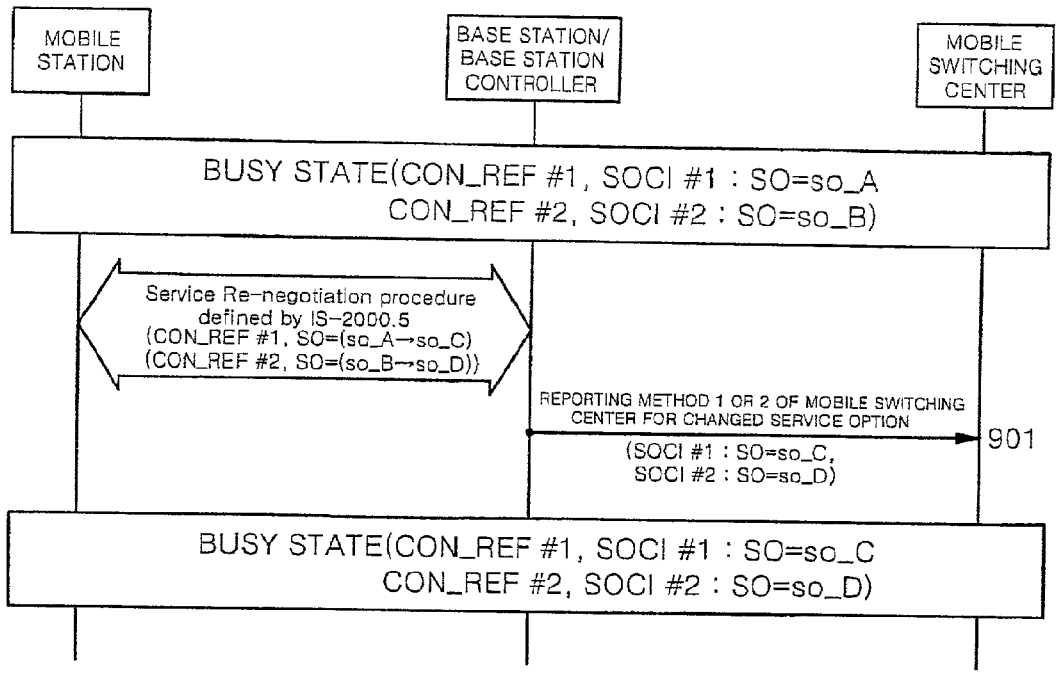
FIG. 9 is a flowchart illustrating a reporting method when one or more service options are changed while all other services are maintained according to the preferred embodiment of the present invention as a result of service option re-negotiation procedure.

With respect to FIG. 9, a procedure of reporting the change is shown, where one or more service options are changed while all other services are maintained. In this procedure, the result of the service option re-negotiation between the mobile station and the base station can be reported to the mobile switching center using either of the Assignment Complete message or the Service Option Report message(step 901).

Figure 10:
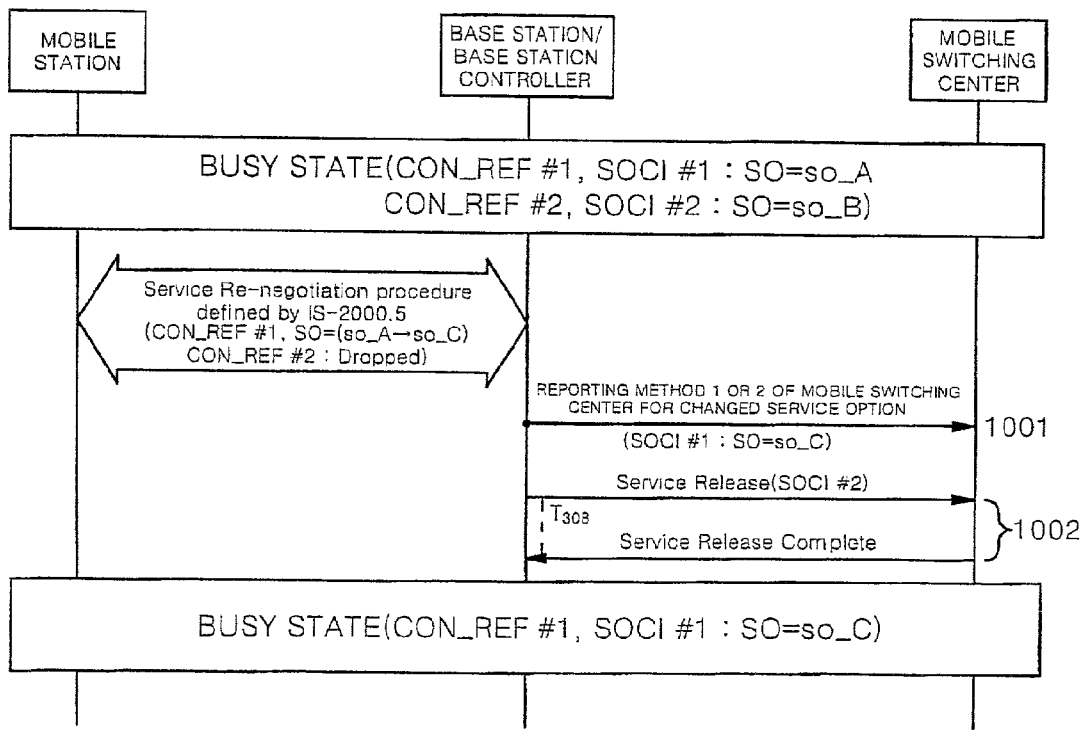
FIG. 10 is a flowchart illustrating a procedure and process in case that one or more services are released and one or more service options are changed according to the present invention as a result of service option re-negotiation procedure.

With respect to FIG. 10, a procedure is shown, where one or more services are released and one or more service options are changed. In this procedure, the result of the service re-negotiation between the mobile station and the base station can be reported to the mobile switching center using either of the Assignment Complete message and the Service Option Report (step 1001). The service options which are to be released are cleared using a Service Release message and a Service Release Complete message (step 1002).

Figure 11:
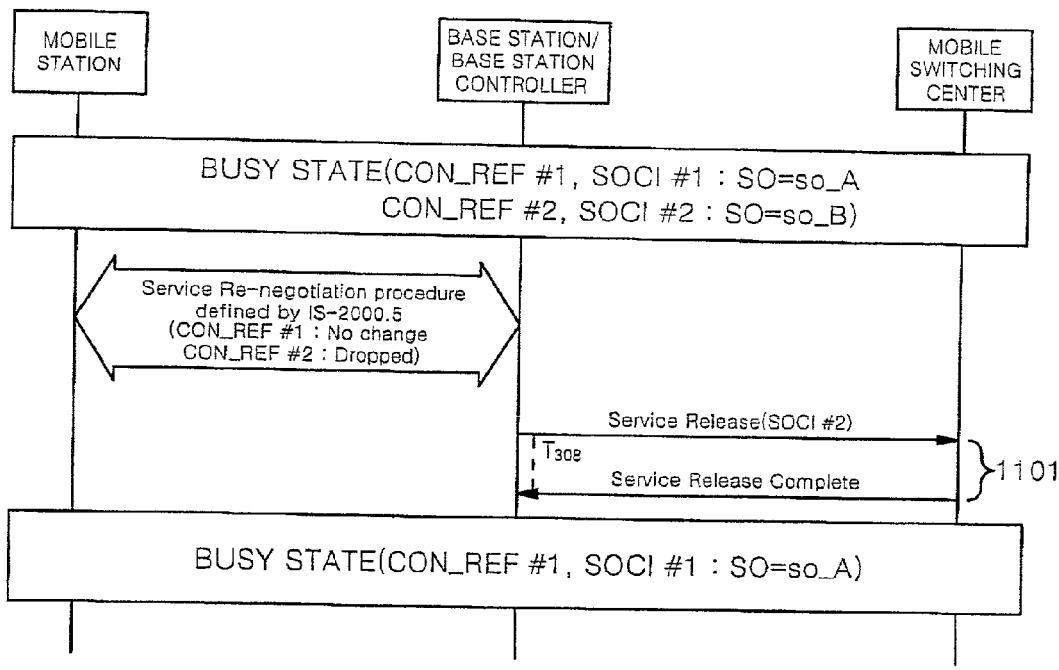
FIG. 11 is a flowchart illustrating a procedure when any service options are not changed and one or more services are released according to the preferred embodiment of the present intention as a result of service option re-negotiation.

Referring to FIG. 11, a procedure is shown where one or more services are released and tie remaining service option is maintained, i. e., the existing service options are not changed. In this procedure, since the service option is not changed, no reporting procedure is required from the base station to the mobile switching center. However, the Service Release/Service Release Complete message including the SOCI information that indicates the released service is transmitted/received between the base station and the mobile switching center to clear the service. (step 1101).

Figure 12:
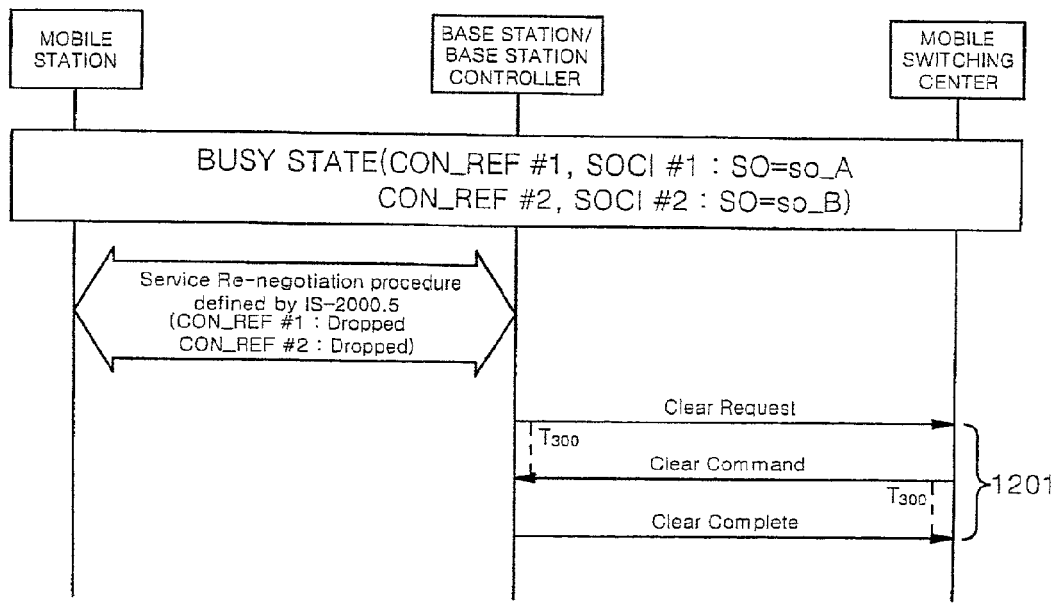
FIG. 12 is a flowchart illustrating a procedure when all the services are released according to the preferred embodiment of the present invention as result of service option re-negotiation.

With respect to FIG. 12, a procedure is shown, where all the services are to be released as a result of service option re-negotiation. In this procedure, a 3G-IOS Clear Request message, Clear Command message, and Clear Complete message are transmitted/received between the base station and the mobile switching center as the call clearing procedure defined in the 3G-IOS.

Next, a preferred method of reporting the changed service option to the mobile switching center after the service option re-negotiation and the method when one or more services are changed, and/or a portion of the service options is released will be described.

According to the method of reporting the changed service option to the mobile switching center after the service option re-negotiation, as shown in FIGS. 4 and 5, only new information elements are added to the existing message, Assignment Complete defined in the 3G-IOS A1 I/F. The new added information element contains information that has changed as a result of the service option re-negotiation.

That is, according to this reporting method, the Assignment Complete message structure (of FIG. 3) defined in the 3G-IOS A1 I/F is modified to include the changed service option in the message structure. Since service re-negotiation may occur during the conversation as well as the call set-up time, the mobile switching center should make the Assignment Complete message processed during both the call setup time and conversation.

In this method, in order to identify and support two or more services (for example, a voice call and a data call) simultaneously, the changed service option is reported to the mobile switching center using the service option list information elements (FIGS. 5 and 6). These elements include the service option connection identifier (SOCI) corresponding to the service option of the Assignment Complete message structure of FIG. 3.

Specifically, when the call is first setup, the completion of the call set-up is reported to the mobile switching center using the service option of the assignment completion message structure. When the service option is then changed through the service option re-negotiation procedure, this event is reported to the mobile switching center along with the service option list information elements of the changed Assignment Complete message structure. The structure and effect of the changed Assignment Complete message are the same as that of FIG. 3 except for the service option portion. Accordingly, the newly added service option list represents the change resulting from the service option re-negotiation.

After being changed, the Assignment Complete message structure includes the service option list information element in order to support the voice call and the data call simultaneously. This information element preferably comprises a service option list IEI, a length for indicating the length of transmitted information, the number of service options for indicating the number of services changed as a result of negotiation, SOCI(#1,#2) for identifying the changed service information, and a service option (i) for indicating the changed service information (i. e., option). The SOCI(#1,#2) and the service option (i) information are repeated as many as the number of service options.

Referring next to FIGS. 7 and 8, in a second embodiment of the present invention, the result of the service option re-negotiation is reported to the mobile switching center in tie form of a new message not previously defined in the 3G-IOS A1 I/F. The new message is a communication I/F between the base station and the mobile switching center.

The Assignment Complete message, as shown in FIG. 4, is the message used for the resource assignment procedure to mate with the assignment request. Thus, according to the second embodiment, a new message, named a Service Option Report, is used to report the changed contents due to the service option re-negotiation. The Service Option Report message structure of FIG. 8 includes a message type, and information in the form of a service option list of FIG. 6.

The service option list is the same as the service option list of FIGS. 5 and 6. Specifically, in order to support two or more services (for example, a voice call and a data call) simultaneously, the service option list comprises a service option list IEI 601, a length 602 for indicating the length of transmitted information, the number of service options 603 for indicating the number of services changed as a result of negotiation, a SOCI(#1,#2) 604 for identifying the changed service, and a service option (i) 605 for indicating the changed service information. The SOCI(#1,#2) and the service option (i) are repeated as many as the number of service options.

In a reporting method according to another embodiment of the present invention, the contents of one or more services may be changed, and/or a portion of the service options may be released as a result of the service re-negotiation.

First, referring to FIG. 9, when a portion or all of the services are changed while all of the services in progress are maintained, the base station reports the changed service option to the mobile switching center in accordance with the method and structure of FIGS. 4 and 5, or FIGS. 7 and 8, respectively.

Second, referring to FIG. 10, when a portion of the services in progress is released and one or more the non-released service options are changed, the base station reports the changed service options to the mobile switching center in accordance with the method and structure of FIGS. 4 and 5, or FIGS. 7 and 8, respectively, and performs a service release procedure with respect to the released service. The service release is performed using the Service Release and Service Release Complete messages defined in the 3G-IOS v4.1.

Referring next to FIG. 11, when a portion of the services in progress is released and other services, which are not the released service, are not changed, the base station is not required to report to the mobile switching center since the contents of service option are not changed. The base station, however, must perform a service release procedure with respect to the released service using the Service Release and Service Release Complete messages defined in the 3G-IOS v4.1.

Finally, referring to FIG. 12, when all of the services in progress are released as a result of the service option re-negotiation between the mobile station and the base station, the base station performs a call release procedure using a Clear Request, Clear Command, and Clear Complete messages defined in the 3G-IOS v4.1.

As described above, the embodiments of the present invention have many advantages. For example, a method of reporting a result of service option re-negotiation to a mobile switching center is provided by adding a service option list to the existing Assignment Complete message. Additionally, a method of reporting the result of a service option re-negotiation using a service option report message, having a new message structure, is provided when the service option re-negotiation procedure is performed with respect to a call made in the mobile communication system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of reporting a changed service option in a mobile communication system, comprising:

transmitting an assignment completion message from a base station or base station controller to a mobile switching center including an initially negotiated service option;

performing a service re-negotiation procedure for changing a service option between a mobile station and the base station or base station controller after the mobile station, the base station or base station controller, and the mobile switching center has entered into a busy state using the initially negotiated service option;

creating a new service option report or assignment completion message including a message type and the changed service option; and transmitting the new service option report or assignment completion message from the base station or base station controller to the mobile switching center.

2. The method of claim 1, wherein the message type, channel number, encryption information and contents of the changed service option are part of the assignment complete message.

3. The method of claim 1, wherein the new service option report is transmitted as a service option list, and wherein the service option list comprises a service option list Information Element Identifier (IEI) field for simultaneously supporting at least one or more services, a length field for indicating a length of transmitted information, a number of service options field for indicating a number of services changed as a result of the re-negotiation, a service option identifier (SOCI) field for identifying the changed service, and a service option (i) field for indicating the changed information.

4. The method of claim 3, wherein if the number of the changed service options is one or more, each of the SOCI information field and the changed service option field are repeated as many as the number of the changed service options.

5. A method of reporting a changed service option in a mobile communication system, comprising:

performing a service re-negotiation procedure for changing a service option between a mobile station and a base station or base station controller after the mobile station, the base station or base station controller, and a corresponding mobile switching center has entered into a busy state using the initially negotiated service option;

creating a new service option report or assignment completion message including a message type and the changed service option; and transmitting the new service option report or assignment completion message from the base station or base station controller to the mobile switching center.

6. The method of claim 5, wherein the new service option report is transmitted as a service option list, and wherein the service option list comprises a service option list information element identifier (IEI) field for simultaneously supporting at least one or more services, a length field for indicating a length of transmitted information, a number of service options field for indicating a number of services changed as a result of the re-negotiation, a service option identifier (SOCI) field for identifying the changed service, and a service option (i) field for indicating the changed information.

7. The method of claim 5, wherein if the number of the changed service options is one or more, each of the SOCI information field and the changed service option field are repeated as many as the number of the changed service options.

8. A method of reporting a service option changed through a service option re-negotiation between a mobile station and a base station or base station controller in a mobile communication system, comprising:

creating a new service option report or assignment completion message including a message type and the changed service option; and transmitting the new service option report or assignment completion message from the base station or base station controller to a corresponding mobile switching center, wherein each of the assignment completion message and the new service option report message includes a service option list field indicating the changed options.

9. The method of claim 8, wherein if at least one service option is changed while all other services are maintained as a result of the service option re-negotiation, the contents of the service re-negotiation between the mobile station and the base station/base station controller are reported to the mobile switching center using one of the assignment completion message and the service option report message.

10. The method of claim 8, wherein if a portion of services in progress is to be released and a service option of a non-released service is changed as a result of the service option re-negotiation, the changed service option is reported to the mobile switching center using one of the assignment completion message or the service option report message, and a service release procedure is performed with respect to the released service using a service release message and a service release completion message.

11. The method of claim 8, wherein if a portion of the services in progress is to be released and non-released services are not to be changed as a result of the service option re-negotiation, a service release procedure is performed with respect to the released service using a service release message and a service release completion message.

12. The method of claim 8, wherein if all services in progress are to be released as a result of the service option re-negotiation, a call release procedure among the mobile station, base station/base station controller, and mobile switching center is performed.

13. The method of claim 8, wherein the service option list field comprises:

a service option list Information Element Identifier (IEI), to identify services provided;

a length field, to indicate a length of transmitted information;

a number of service options field, to indicate the number of services changed as a result of negotiation;

a service option connection identifier (SOCI) field, to identify the changed service; and a service option field, to indicate the corresponding service information.

14. The method of claim 13, wherein if the number of the changed service options is one or more, each of the SOCI information field and the changed service option field are repeated as many as the number of the changed service options.

15. A method of reporting a change in a service option in a communication system, comprising:

transmitting an assignment completion message from a base station or base station controller to a mobile switching center including an initially negotiated service option;

performing a service re-negotiation procedure for changing a service option between a mobile station and the base station or base station controller after the mobile station, the base station or base station controller, and the mobile switching center has entered into a busy state using the initially negotiated service option;

creating a new service option report or assignment completion message including a message type and the changed service option; and transmitting the new service option report or assignment completion message from the base station or base station controller to the mobile switching center, wherein the new service option report or assignment completion message comprises a message type field and a service option list field.

16. The method of claim 15, wherein the assignment complete message further comprises a channel number field, and encryption information field, and a service option field.

17. The method of claim 16, wherein the service option list field comprises:

a service option list Information Element Identifier (IEI), to identify services provided;

a length field, to indicate a length of transmitted information;

a number of service options field, to indicate the number of services changed as a result of negotiation;

a service option connection identifier (SOCI) field, to identify the changed service; and a service option(i) field, to indicate the corresponding service information.

18. The method of claim 17, wherein each of the SOCI field and the service option (i) field are repeated for a number of times equal to the contents of the number of service option field.

19. The method of claim 15, wherein the new service option report contains no additional fields.

20. A Service Option Report message to report a change in services of a call in a communication network, comprising:

a service option list Information Element Identifier (IEI), to identify services provided;

a length field, to indicate a length of transmitted information;

a number of service options field, to indicate the number of services changed as a result of re-negotiation after an initially negotiated service option is being used in a busy state of the communication network, said re-negotiation occurring during an already established call;

a service option connection identifier (SOCI) field, to identify the changed service; and a service option(i) field, to indicate the corresponding service information, wherein the service option report message is a new service option report created during a re-negotiation procedure for changing a service option between a mobile station and corresponding base station or base station controller, and wherein the new service option report is transmitted from the base station or base station controller to a corresponding mobile switching center to inform the mobile switching center about the re-negotiation services.

21. The message of claim 20, wherein the service option list (IEI) permits the communication system to simultaneously support at least two services.

22. The message of claim 20, wherein each of the SOCI and the service option(i) information fields are repeated in the message for a number of times equal to the number of service options.

23. The message of claim 20, wherein the Service Option Report message is generated in response to a service re-negotiation.

* * * * *